United States Patent
Saroiu et al.

(10) Patent No.: US 8,832,461 B2
(45) Date of Patent: Sep. 9, 2014

(54) TRUSTED SENSORS

(75) Inventors: Stefan Saroiu, Redmond, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/823,150

(22) Filed: Jun. 25, 2010

(65) Prior Publication Data

US 2011/0320823 A1    Dec. 29, 2011

(51) Int. Cl.
*G06F 11/30* (2006.01)
*G06F 21/57* (2013.01)
*G06F 21/53* (2013.01)

(52) U.S. Cl.
CPC ............... *G06F 21/57* (2013.01); *G06F 21/53* (2013.01)
USPC ................. 713/189; 726/3; 726/5; 455/456.3

(58) Field of Classification Search
CPC .................................. G06F 21/57; G06F 21/53
USPC .......................... 726/3, 5; 713/189; 455/456.3
See application file for complete search history.

(56) References Cited

U.S. PATENT DOCUMENTS

| | | | |
|---|---|---|---|
| 2006/0277414 A1 | 12/2006 | Kotani et al. | |
| 2007/0165273 A1 | 7/2007 | Miyamura et al. | |
| 2008/0182592 A1* | 7/2008 | Cha et al. ................... | 455/456.3 |
| 2009/0172781 A1* | 7/2009 | Masuoka et al. .................. | 726/3 |

OTHER PUBLICATIONS

Bahl (Trusted Sensors, Jun. 2-3, 2010).*
Wu (A geotagging scheme using image steganography and GPS information authentication, IEEE 2009).*
Lioy, et al., "Trusted-Computing Technologies for the Protection of Critical Information Systems", Retrieved at << http://www.mirlabs.org/jias/lioy.pdf >>, Journal of Information Assurance and Security, vol. 4, Issue 5, 2009.
Shaneck, et al., "Remote Software-based Attestation for Wireless Sensors", Retrieved at << http://citeseerx.ist.psu.edu/viewdoc/download?doi=10.1.1.133.5516&rep=rep1&type=pdf >>, Security and Privacy in Ad-hoc and Sensor Networks, Second European Workshop, ESAS Jul. 13-14, 2005.
Gilbert, et al., "Toward Trustworthy Mobile Sensing", Retrieved at << http://www.cs.duke.edu/~lpcox/gilbert-p51.pdf >>, Workshop on Mobile Computing Systems and Applications, Proceedings of the Eleventh Workshop on Mobile Computing Systems & Applications, Feb. 22-23, 2010.
Chang, Vincent., "Channels:: Mobile Computing", Retrieved at << http://www.hardwarezone.com/articles/view.php?id=2295&cid=14&pg=2 >>, Jun. 25, 2007.
Huang, et al., "Secure encrypted-data aggregation for wireless sensor networks", Retrieved at << http://www.springerlink.com/content/g573138072642u63/ >>, Wireless Networks, vol. 16, No. 4, 2010, published May 7, 2009.

(Continued)

*Primary Examiner* — Brian Shaw
(74) *Attorney, Agent, or Firm* — Steve Wight; Carole Boelitz; Micky Minhas

(57) ABSTRACT

Architecture that provides trusted sensors and trusted sensor readings on computing devices such as mobile devices. The architecture utilizes a trustworthy computing technology (e.g., trusted platform module (TPM). In the context of TPM, one implementation requires no additional hardware beyond the TPM and a virtualized environment to provide trusted sensor readings. A second implementation incorporates trusted computing primitives directly into sensors and enhances security using signed sensor readings. Privacy issues arising from the deployment of trusted sensors are also addressed by utilizing protocols.

20 Claims, 7 Drawing Sheets

(56) References Cited

OTHER PUBLICATIONS

"Fujitsu Expands Mobile Offerings with Suite of Security Features", Retrieved at << http://www.shopfujitsu.com/www/news_archive.shtml?aboutus/pressreleases/pr_113004 >>, Retrieved Date: Mar. 25, 2010, published Nov. 30, 2004.

"AMD64 Architecture Programmer's Manual", Retrieved at << http://www.amd.com/us-en/assets/content_type/white_papers_and_tech_docs/24593.pdf >>, vol. 2, Sep. 2007.

"Swine Flu Tracker Map iPhone Game", Retrieved at << http://www.1888freeonlinegames.com/iphonegames/free-swine-flu-tracker-map-119.html >>, Version 1.0, Retrieved Date: Mar. 25, 2010, released May 13, 2009.

Brickell, et al., "Direct Anonymous Attestation", Retrieved at << http://eprint.iacr.org/2004/205.pdf >>, Feb. 11, 2004.

Brik, et al., "Wireless Device Identification with Radiometric Signatures", Retrieved at << http://www.winlab.rutgers.edu/~gruteser/papers/brik_paradis.pdf >>, International Conference on Mobile Computing and Networking, Proceedings of the 14th ACM international conference on Mobile computing and networking, Sep. 14-19, 2008.

Dua, et al., "Towards Trustworthy Participatory Sensing", Retrieved at << http://www.usenix.org/event/hotsec09/tech/full_papers/dua.pdf >>, In Proceedings of the 4th HotSec, Aug. 2009.

Feige, et al., "Witness Indistinguishable and Witness Hiding Protocols", Retrieved at << http://citeseerx.ist.psu.edu/viewdoc/download;jsessionid=C37100F15E3CAAA301AEC1E7F38C2EDA?doi=10.1.1.73.3911&rep=rep1&type=pdf >>, Annual ACM Symposium on Theory of Computing, Proceedings of the twenty-second annual ACM symposium on Theory of computing, May 13-17, 1990.

Fretzagias, et al., "Cooperative Location-sensing for Wireless Networks", Retrieved at << http://www.ics.forth.gr/tnl/mobile/publications/percom04.pdf >>, PERCOM, Proceedings of the Second IEEE International Conference on Pervasive Computing and Communications (PerCom'04), Mar. 14-17, 2004.

Ganeriwal, et al., "Reputation-based Framework for High Integrity Sensor Networks", Retrieved at << http://citeseerx.ist.psu.edu/viewdoc/download;jsessionid=2523B8D517E86F4FDAD4976107571BC0?doi=10.1.1.83.100&rep=rep1&type=pdf >>, ACM Transactions on Sensor Networks, vol. V, No. N, Sep. 2007.

Goldwasser, et al., "The Knowledge Complexity of Interactive Proof-systems", Retrieved at << http://groups.csail.mit.edu/cis/pubs/shafi/1985-stoc.pdf >>, SIAM Journal on Computing, vol. 18, No. 1, Feb. 1989.

Goldwasser, et al., "Efficient Transformation of Well Known Signature Schemes into Designated Confirmer Signature Schemes", Retrieved at << http://74.125.153.132/search?q=cache%3A2eIS-DAjeF4J%3Awisdomarchive.wisdom.weizmann.ac.il%3A81%2Farchive%2F00000348%2F01%2Fg03.pdf+Efficient+transformation+of+well+known+signature+schemes+into+designated+confirmer+signature+schemes&hl=en&gl=in >>, Department of Computer, Sep. 3, 2003.

"Panoramio—Photos of the World, 2009.", Retrieved at << http://www.panoramio.com. >>, Retrieved Date: Mar. 25, 2010.

Gummadi, et al., "Not-a-Bot (NAB): Improving Service Availability in the Face of Botnet Attacks", Retrieved at <<http://pages.cs.wisc.edu/~akella/CS838/F09/838-Papers/gamechangers.pdf >>, In the proceedings of Networked Systems Design and Implementation, (NSDI), Apr. 2009.

Hengartner, Urs., "Location privacy based on trusted computing and secure logging", Retrieved at << http://www.cs.uwaterloo.ca/~uhengart/publications/securecomm08.pdf >>, Proceedings of the 4th international conference on Security and privacy in communication netowrks, Sep. 22-25, 2008.

Lenders, et al., "Location-based Trust for Mobile User-generated Content: Applications, Challenges and Implementations", Retrieved at << http://www.peizhang.com/publications/lenders_geotrust.pdf>>, Workshop on Mobile Computing Systems and Applications, Proceedings of the 9th workshop on Mobile computing systems and applications, Feb. 25-26, 2008.

Liu, et al., "Attack-resistant location estimation in sensor networks", Retrieved at << http://discovery.csc.ncsu.edu/pubs/ipsn05.pdf >>, Information Processing In Sensor Networks, Proceedings of the 4th international symposium on Information processing in sensor networks, Apr. 24-27, 2005.

Mohan, et al., "Nericell: rich monitoring of road and traffic conditions using mobile smartphones", Retrieved at << http://research.microsoft.com/pubs/78568/Nericell-Sensys2008.pdf >>, Conference On Embedded Networked Sensor Systems, Proceedings of the 6th ACM conference on Embedded network sensor systems, Nov. 5-7, 2008.

Paulos, et al., "Sensing Atmosphere", Retrieved at << http://www.paulos.net/papers/2007/Sensing%20Atmosphere%20(Sensys%202007%20Workshop).pdf>>, Workshop position paper for the Sensing on Everyday Mobile Phones in Support of Participatory Research at ACM SenSys, Nov. 2007.

Venere, et al., "Cell phone sensors detect radiation to thwart nuclear terrorism", Retrieved at << http://news.uns.purdue.edu/x/2008a/080122FischbachNuclear.html >>, Jan. 22, 2008.

Saroiu, et al., "Enabling new mobile applications with location proofs", Retrieved at << http://research.microsoft.com/en-us/um/people/ssaroiu/publications/hotmobile/2009/proofs.pdf >>, Workshop on Mobile Computing Systems and Applications, Proceedings of the 10th workshop on Mobile Computing Systems and Applications, Feb. 23-24, 2009.

Tippenhauer, et al., "Attacks on public wlan-based positioning systems", Retrieved at << http://www.syssec.ethz.ch/research/tippenhauer08attacks.pdf >>, International Conference On Mobile Systems, Applications And Services, Proceedings of the 7th international conference on Mobile systems, applications, and services, Jun. 22-25, 2009.

Tootoonchian, et al., "Lockr: Better Privacy for Social Networks", Retrieved at << http://www.lockr.org/papers/lockr-conext2009.pdf >>, International Conference On Emerging Networking Experiments And Technologies, Proceedings of the 5th international conference on Emerging networking experiments and technologies, Dec. 1-4, 2009.

"Wi-Fi FreeSpot. Directory", Retrieved at << http://www.wififreespot.com. >>, Retrieved Date: Mar. 25, 2010.

TPM Specification version 1.2, found at http://www.trustedcomputinggroup.org/resources/tpm_main_specification, 2009.

* cited by examiner

TRUSTED SENSORS

BACKGROUND

A factor contributing to the rapid growth of smartphones and other mobile-capable devices is the incorporation of sensors into these devices. Mobile devices can be equipped with many sensors, such as a geolocation sensor (e.g., GPS—global positioning system), a camera, a microphone, an accelerometer, a proximity sensor, combinations thereof, and so on. This variety of sensors has given rise to a huge increase in mobile applications.

It is relatively easy for an application to fabricate or lie about readings from these sensors. For example, users can easily lie about locations by fabricating or altering readings from GPS sensors, or users can modify the pictures taken by cameras. Thus, the data obtained from these sensors is not considered to be "trustworthy", in that the readings may have been altered (e.g., by a user) before being transmitted remotely to a server or to the cloud (clusters of servers disposed on the Internet). As a result, developers are reluctant to build mobile applications where users have an incentive and the ability to cheat.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs hardware support at least with respect to sensors to reduce or eliminate the ability to manipulate or spoof the sensor data and thereby provide trusted computing to make the data obtained from sensors trustworthy. With a trusted sensor, tampering with the readings for the sensor cannot be performed without being detected. A trusted sensor is a sensor that is enhanced with a trustworthy computing technology such as TPM (Trusted Platform Module) to secure sensor readings. In the context of TPM, for example, solutions for making sensors trustworthy include the presence of a TPM chip in the mobile device, and the capability of the sensor to sign associated sensor readings.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
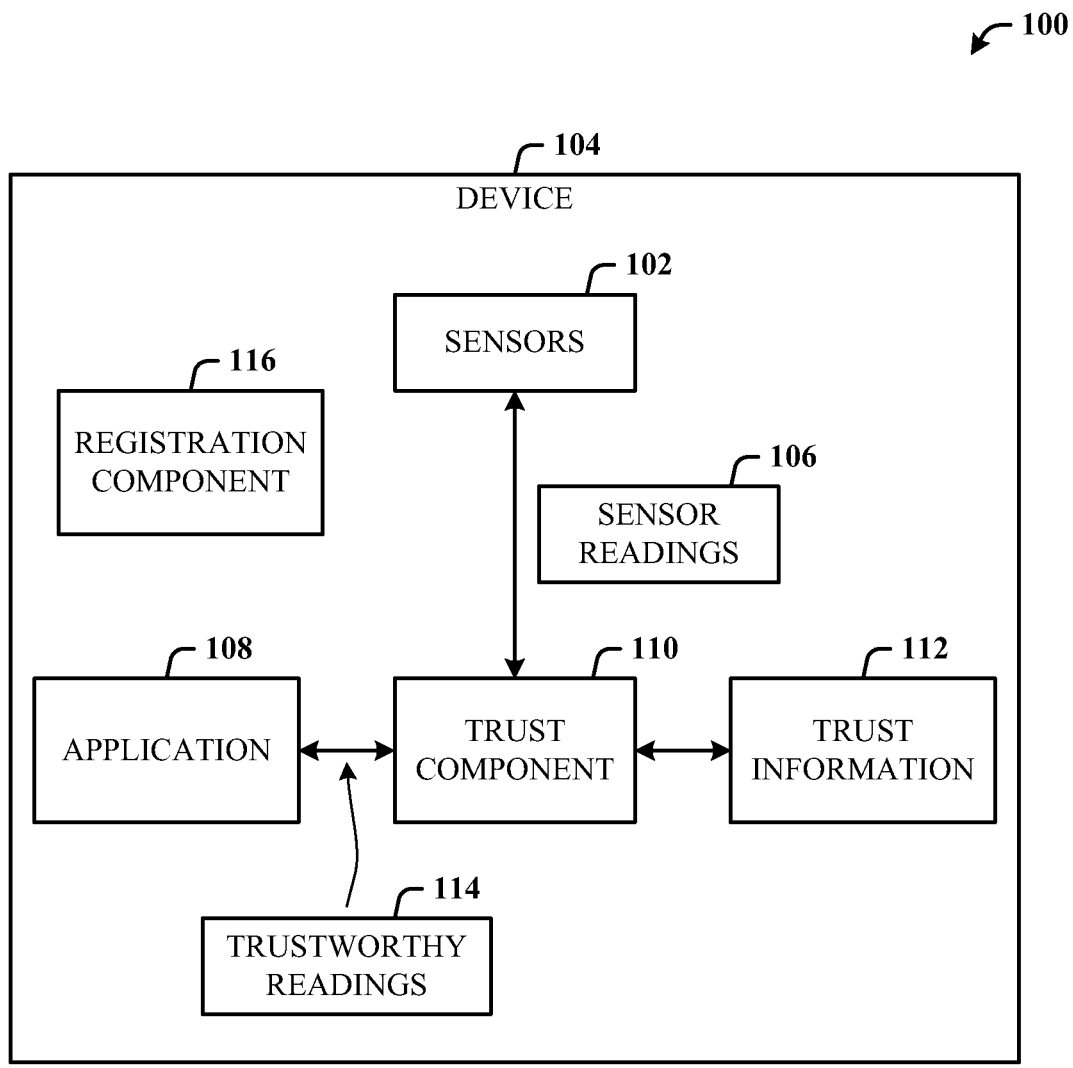
FIG. 1 illustrates a sensor system that employs trusted computing in accordance with the disclosed architecture.

The disclosed architecture provides solutions that make sensors (and sensor data) trustworthy. Accordingly, a broad range of applications can benefit from the deployment of trusted sensors, from participatory sensing to monitoring energy consumption. The architecture utilizes a trustworthy computing technology such as trusted platform module (TPM). Although described in the context of using TPM, it is to be understood that the disclosed architecture is also applicable to other security technologies for trustworthy computing as well. For example, any trustworthy computing technology can be employed that provides the ability to attest the software configuration running on the device (e.g., smartphone, computer system, etc.) and/or the ability to sign a piece of data with a secret key. The secret key should be highly guarded (e.g., by integrating the secret key into a chip).

One implementation requires no additional hardware beyond TPM, and a second implementation enhances security using signed sensor readings. Privacy issues arising from the deployment of trusted sensors are also addressed by utilizing protocols.

The disclosed architecture is not limited to mobile applications. A system-wide TPM is employed to increase the trustworthiness of sensor readings, and another directly integrates TPM functions into the sensors. Thus, trusted sensors can be provided for applications in general. Other sensors that can be employed and which can obtain the benefits of the disclosed architecture include, but are not limited to, fingerprint readers, radiation detectors, water quality sensors, and personal health sensors.

A TPM is a specialized piece of hardware, shipped with many desktops and laptops, for example, that offers at least three trusted computing primitives: remote attestation—enables users to remotely attest that a machine booted a certain hardware and software configuration; sealed storage—protects data by binding it to a particular TPM and software configuration in a way that can only be accessed by the same combination of hardware and software; and, secure boot—ensures that the machine can only boot a certain hardware and software configuration.

A TPM offers a number of platform configuration registers (PCRs) and two related instructions: reading a PCR and "extending" a PCR. The number of registers can vary for each TPM version. Extending a PCR is a way of updating the register; an extend call takes as input a piece of data, hashes it, and performs a logical OR operation with the register's current value. Thus, the value found in a PCR register is a function of all the previous hash values (a running hash) with which the PCR has been "extended". All PCR registers are cleared upon a reboot.

When a TPM-enabled machine boots, the machine calculates a hash of the BIOS (basis input/output) code and extends one of the PCR registers with the result, a process referred to as a "measurement". The BIOS code then executes and before passing control to the loader, the BIOS hashes the loader code and extends the same PCR register (i.e., measures the loader), computing a running hash. Each step during the boot-up is performed the same way: the next piece of code ready to run is first hashed and the hash value is used to extend a PCR register. This running hash effectively creates a secure chain of trust, where each measurement authenticates a step during boot-up.

A remote attestation is a piece of data containing the values of certain PCRs signed by the TPM. The TPM's signature ensures the PCRs' integrity; a verifier can then check whether the PCR values match those that should be obtained when booting the "correct" software configuration.

With sealed storage, data is stored encrypted with a key that is a function of the values stored in the PCRs. The encryption key is protected by the TPM and released only if the PCRs hold the same values as when the data was sealed. This ensures data is unsealed by the same software that sealed it in the first place.

For secure boot, the OS (operating system) image is encrypted with a key that has been sealed by the TPM. When booting up, the TPM measures each boot step from the BIOS to the loader. Once the OS is ready to load, the TPM checks whether the values found in the PCR registers match the ones that the OS image's encryption key has been sealed with. This ensures that none of the boot code has been tampered with; in this case, the TPM then releases the key needed to decrypt the OS image. Once decrypted, the OS image is loaded to finish the secure boot process.

To illustrate how trusted sensors work, consider the example of a participatory-sensing system that relies on users transmitting photos along with their location information. With trusted GPS and camera sensors, a photo is combined with a GPS reading and a timestamp, and then signed with a private key specific to the mobile device. The goal of this architecture is to ensure that untrusted software running on the mobile device cannot interfere with reading the sensor values. Once the data is uploaded to a geo-tagging website, the signature is verified and then the photo is added to the collection along with its time and location. This makes it much harder for a rogue user to upload incorrect information into the database.

Privacy is a concern for any service where uploaded data can be tied back to a particular mobile device. Two possible approaches to alleviate this concern are described. First, the trusted sensor software must be architected to allow users to easily remove signatures from the sensor readings. Because unsigned readings can easily be fabricated, the unsigned readings reduce the privacy risks. The user can then choose whether or not to provide the signature along with the sensor reading to either a local application or a remote cloud service.

The second approach to alleviate privacy concerns is to use cryptographic protocols that protect users' privacy. One possibility is to use the TPM's anonymous attestations to provide users with anonymity. Another approach is to use zero-knowledge protocols to prove that a sensor reading is signed by a TPM. Rather than pass along a signed sensor reading from a mobile device to a remote service, zero-knowledge proofs allow a mobile client to prove to a remote server that they possess a signed sensor reading without directly revealing the signature.

Chip manufacturers have enhanced trusted computing primitives with additional extensions (called TXT—trusted extension technology) for TPM that includes a new class of PCRs, called dynamic PCRs, and a new CPU instruction. These extensions perform code measurements without needing to establish an entire chain of trust starting from the BIOS (i.e., a running hash).

One version of the new CPU instruction takes as input a physical memory address where a small loader resides. When invoked, the dynamic PCR registers are cleared, DMA (direct memory access) to the physical pages storing the code for the small loader is disabled, interrupts are turned off, and debugging is disabled. The TPM performs a measurement of the loader before the processor starts to execute it. As the loader executes, it loads an application and measures the application with the TPM; once the measurement is complete and the result is stored in the dynamic PCRs, the loader starts executing the application.

The goal of anonymous attestation is to protect a TPM's identity while still enabling a verifier to check that a remote attestation has been signed by a valid TPM (i.e., without revealing the TPM's identity). One version of TPM can provide anonymous attestations by using a separate Attestation Identity Key (AIK) for each verifier and relying on a privacy certification authority (privacy CA). A TPM generates an AIK key, signs it, and sends it to the privacy CA. The privacy CA checks the signature and returns a certificate. The TPM uses this certificate to anonymously sign attestations. A verifier can contact the privacy CA to check the validity of the TPM certificate. A more recent version of TPM implements an additional anonymous attestation scheme, called Direct Anonymous Attestation (DAA), which does not need a privacy CA.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a sensor system 100 that employs trusted computing in accordance with the disclosed architecture. (As used herein, the terms "trust" and "trusted" apply to any trustworthy computing technology, and is not intended to refer solely to TPM technology.) The sensor system 100 comprises sensors 102 of a device 104 that generate sensor readings 106 for consumption by an application 108, and a trust component 110 of the device 104 that provides trust information 112 which is applied to the sensor readings 106 to create trustworthy readings 114 for communication to the application 108.

As described in greater detail below, the trust component 110 can include a virtualization component that virtualizes the sensors 102 and facilitates interaction with the sensors 102 by the application 108 via the virtual sensors. The virtualization component includes virtual machines that isolate the application 108 from the sensors 102 and communicate the trust information and sensor readings to the application 108. The trust information 112 is provided by a trust module and according to a trustworthy computing technology (e.g., TPM). The virtualization component assigns time information to a sensor reading, and signs the time information and the sensor reading with the trust information 112 to create a trustworthy sensor reading for consumption by the application 114.

The trust component 110 can include trust software that is located at one or more of the sensors 102, and which provides and applies sensor trust information to raw sensor readings from the sensors. The trust component 110 can include code that combines signed raw sensor readings from the sensors 102 and verifies the trust information of each of the signed raw sensor readings.

A sensor can increment a secure counter at a central hardware trust module which provides the trust information 112, obtains a counter value of the counter, and applies the sensor trust information to the raw sensor reading and the counter value at the sensor. The sensor readings of corresponding sensors of the device 104 are tagged with time information and signed by the trust information 112. The sensor readings 106 can be verified as from the device 104 based on a threshold time differential of the time information.

The trust component 110 prevents transferability of a sensor reading by employing a knowledge protocol (e.g., zero-knowledge proof, witness hiding proof of knowledge) that reveals the sensor reading of a signed sensor reading without revealing a signature used to sign the sensor reading. The system 100 can further comprise a registration component 116 that registers the sensors 102 and the device 104 to a registration service to identify the sensors 102 as associated with the device 104.

Figure 2:
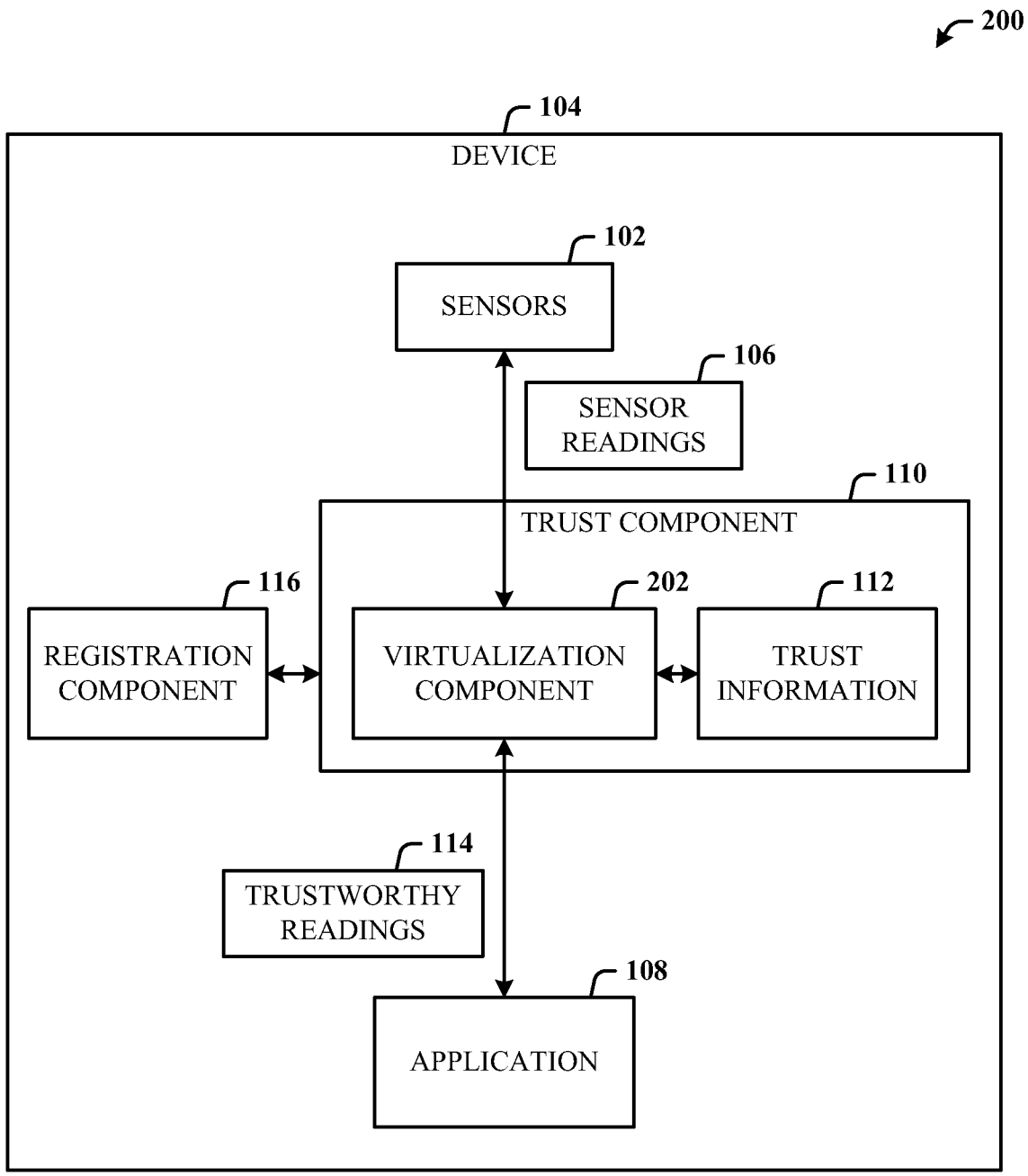
FIG. 2 illustrates an alternative embodiment of sensor system that employs trusted computing.

FIG. 2 illustrates an alternative embodiment of a sensor system 200 that employs virtualization and trusted computing. Here, the trust component 110 employs a virtualization component 202 that virtualizes the sensors 102 and facilitates interaction with the sensors 102 by the application 108. The trust component 110 provides the trust information 112 to the virtualization component 202 as needed, for signing purposes (e.g., to the sensor readings 106 to create the trustworthy readings 114 for communication to the application 108. In this case, the virtualization component 202 can include virtual machines that provide isolation between the application 108 and the sensors 102. This is described in greater detail in FIG. 3. Following is a detailed description of at least two trusted sensor embodiments. A first embodiment assumes no additional hardware beyond a trust chip on the mobile device (e.g., the device motherboard). To make a sensor reading trusted, this design includes an isolated attester: a small piece of trusted code that runs isolated from the device's kernel and applications. A second design incorporates trusted computing primitives into sensors to enable a sensor to sign its readings. This ensures that any tampering with a sensor reading can be detected because the tampering will invalidate the signature.

The first embodiment is software-based and employs a lower barrier to deployment because by does not requiring significant hardware modifications, and the second embodiment is more tamper resistant to the sensor readings by employing more hardware modifications.

The main challenges of the first embodiment are two-fold: reading the sensor using a non-malicious piece of code that does not tamper with the reading, and ensuring that the reading cannot be tampered with while being sent to an application or to the cloud. These goals are accomplished through a combination of virtualization and trusted computing.

Note that where the device 104 is a handheld smart device (e.g., a mobile phone, smart tablet, etc.), the device 104 can include one or more application programs, other program modules, the hardware trust module and program data that include the entities and components of the system 100 of FIG. 1. This applies to the system 200 of FIG. 2 and system 300 of FIG. 3 as well.

Figure 3:
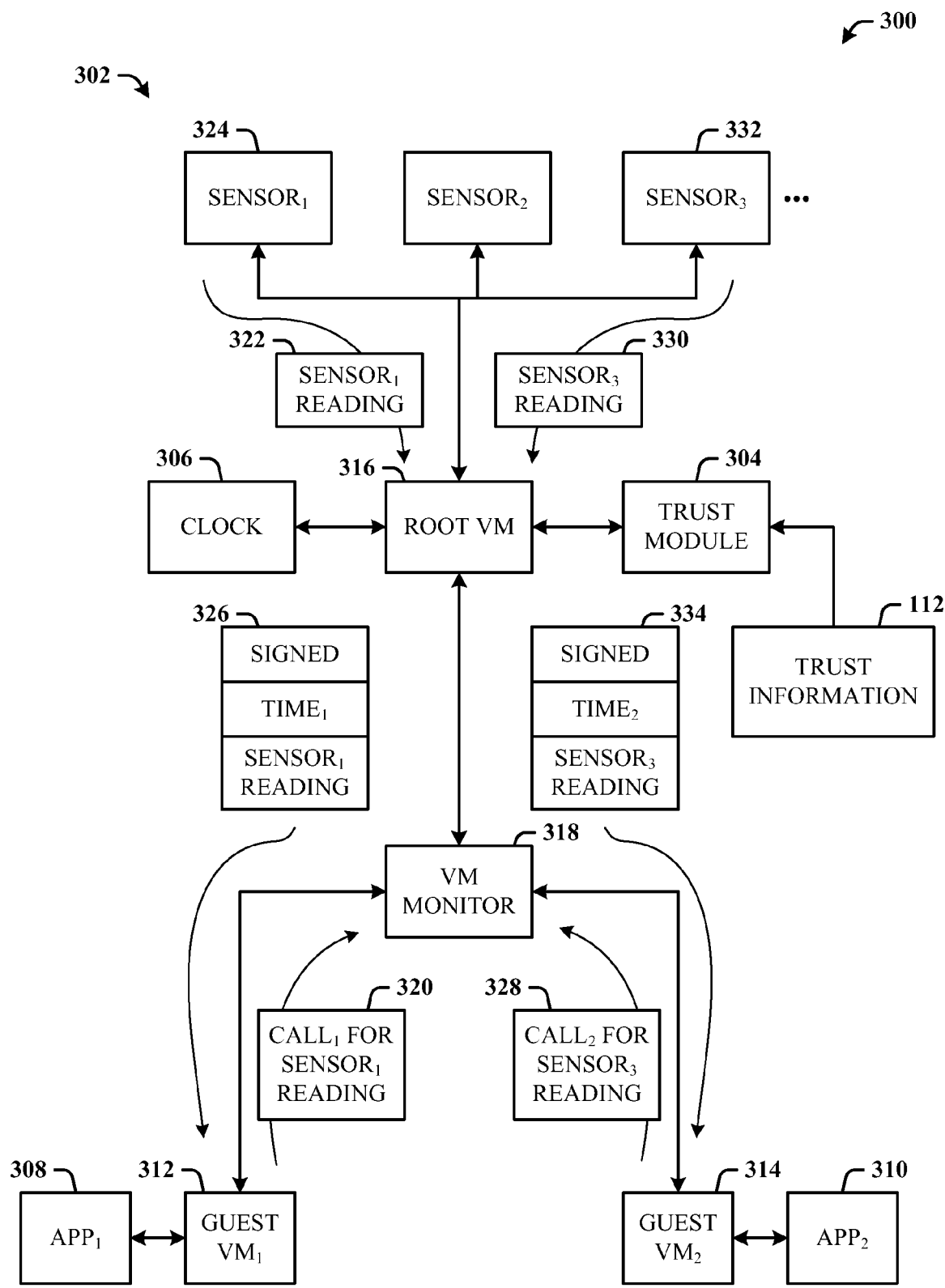
FIG. 3 illustrates a detailed implementation of a sensor system that employs virtualization and trusted computing.

FIG. 3 illustrates a detailed implementation of a sensor system 300 that employs virtualization and trusted computing. The system 300 can be a mobile device, computing device, etc. The system 300 includes sensors 302 (similar to sensors 102) that output sensor readings, a trust module 304 (as part of the trust component 110), a system clock 306, a first user application 308 that requests sensor readings and a second user application 310 that requests sensor readings.

In the virtualization design, the user's software environment (the virtualization component) run as one or more guest virtual machines (VMs), such as a first guest VM 312 and a second guest VM 314. A root VM 316 is started and inaccessible to the user. The role of the root VM 316 is to read the device sensors 302, use the trust module 304 to sign the readings (and other information as desired), and communicate the signed readings to the guest VMs (312 and 314).

A VM monitor 318 (also referred to as a hypervisor) allows multiple operating systems to run concurrently and virtualizes the remaining hardware devices (all devices other than the trusted sensors 302) so that the guest VMs (312 and 314) can still access these sensors 302.

When a sensor reading is needed, the user application makes a hypervisor call to obtain a signed reading from the root VM. As long as the hypervisor and the root VM 316 remain uncompromised, the user application has no way to directly read the sensors 302. In the context of using TPM, the TPM secure boot features can be used to ensure that the device boots the correct software configuration. The design also employs an IOMMU (input/output memory management unit) to avoid DMA attacks mounted from a guest VM because such DMA attacks could bypass the hypervisor's isolation.

Trusted sensing applications can combine sensor readings. In particular, knowing that a standalone sensor reading is a valid reading is much less useful than knowing when and where that reading was obtained. Time is utilized as the common element to enable combining readings. Here, the first application 308 running in association with the first guest VM 312 initiates a call 320 for a reading 322 from a first sensor 324. A hypervisor call is invoked that reads the first sensor 324 and the clock 306. The reading 322 of the first sensor 324 and the reading of the clock 306 are both then signed by the trust module 304 and passed back as a signed set 326 to the first application 308.

Once signed by the trust module 304, these readings cannot be modified. This ensures that even though the reading 322 is now handled by untrusted software running in the first guest VM 312, the software cannot tamper with the reading 322 without being detected.

Incorporating time into each signed reading also enables a remote service to combine multiple sensor readings. For example, a signed photo plus timestamp t1 generated by the trust module 304 can be combined with a signed GPS location plus timestamp t2 signed by the same trust module 304. The verifier can check that the signing module (e.g., trust module 304) is the same and that the time difference between t1 and t2 is less than a threshold (e.g., less than five seconds apart).

As illustrated, the system 300 can run multiple guest VMs, such as the second guest VM 314 and associated second application 310. The second application 310 initiates a call 328 for a reading 330 from a third sensor 332. The hypervisor call reads the third sensor 332 and the clock 306. The reading 330 of the third sensor 332 and the reading of the clock 306 are both then signed by the trust module 304 and passed back as a signed set 334 to the second application 310 via the second guest VM 314. Again, once signed by the trust module 304, these readings cannot be modified. This ensures that even though the reading 330 is now handled by untrusted software running in the second guest VM 314, the software cannot tamper with the reading 330 without being detected.

Figure 4:
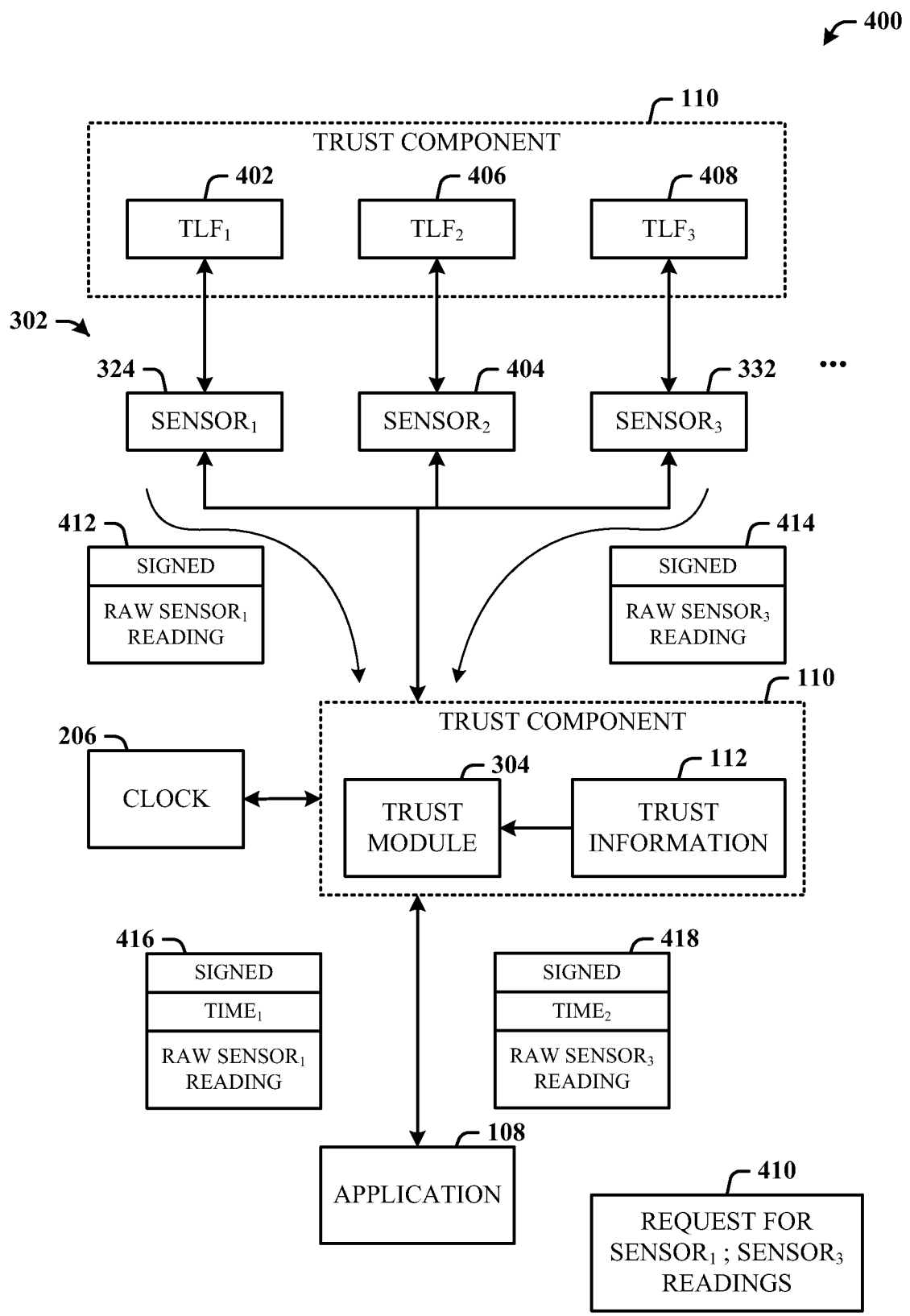
FIG. 4 illustrates an alternative embodiment of a system that employs virtualization and trusted computing and integrates the TPM-like functionality into each of the sensors.

FIG. 4 illustrates an alternative embodiment of a system 400 that integrates trust-like functionality (TLF) into each of the sensors 302. This enables each sensor reading to be signed by the associated sensor (and related I/O components) that generate the reading, independent of the software configuration of the device (e.g., smartphone). Thus, signed raw sensor readings can be provided without relying on the trusted boot features.

Here, the system 400 includes the sensors 202, the trust component 110 (as having the trust module 304 and trust information 112 and now, the TLF components at the sensors 302), the clock 306, and the trust application 108 operating in communication with the trust component 112. However, the trust component 110 is not necessarily employed here as is described in the previous systems. In system 400, each of the sensors 302 now has an associated TLF component to provide the signing of raw sensor readings, and for other purposes. For example, the first sensor 324 includes a first TLF component 402, a second sensor 404 includes a second TLF component 406, and the third sensor 332 includes a third TLF component 408.

In operation, the application 108 initiates a request 410 for sensor readings (from the first sensor 324 and the third sensor 332). In response, the first TLF 402 signs the raw sensor reading to create a signed reading set 412, and the third TLF 408 signs the raw sensor reading to create a signed reading set sensor 414. The signed sets (412 and 414) are passed to the trust component 110, where timestamps can be added. Note that the signed sets (412 and 414) can be timestamped at different times, and thus, can be tagged with different timestamps. As before, this can be acceptable as long as the time differential between the sets (412 and 414) is within a predefined threshold (e.g., one minute).

The readings returned from the trust component 110 now have timestamps (now referred to a timestamped signed reading sets): a first timestamped signed reading set 416 for the first sensor 324 and a third timestamped signed reading set 418 for the third sensor 332. The timestamped signed reading sets (416 and 418) are then sent to the application 108 for processing.

Note that in this system 400, the trust module 304 is not needed for signing the sensor readings, since the readings are already signed at the sensor using the TLF component. However, it can be the case that not all sensors have associated TLF. In such a situation, the trust module 304 can be employed to sign the readings for a non-TLF sensor.

To enable application-specific code that uses multiple raw sensor readings as input and provides a high-level result to a cloud service, the TXT extensions on the CPU of mobile device, for example, can be leveraged. The cloud service provides a small piece of trusted code to the mobile device that combines the raw sensor readings, and this code performs signature verification on each raw sensor reading. The TXT extensions enable the cloud service to verify that the mobile device was actually the trusted sensor processing code.

To enable a remote service to know which sensors are associated with a particular device, a device "registration" process is employed. The cloud service generates a nonce, and the mobile device's trust module (e.g., TPM chip) and each of its trusted sensors signs the nonce, along with a timestamp, using registration keys. The cloud service then stores the registered public keys for the device's trust module and for each of its trusted sensors. Therefore, as long as the mobile device is not compromised at device registration time, the cloud service can now know (and identify) which sensors a user's mobile device contains.

To enable the tying together multiple sensor readings, time data is utilized as the common element. However, incorporating a secure clock into each hardware sensor may be challenging. Rather, when each sensor generates a signed reading, the sensor contacts the motherboard-sited trust module and increments a secure counter (one that is initialized at device registration time). The sensor concatenates the trust module-signed counter value with the current sensor reading, and then signs both.

Consider an example of how to use this infrastructure to generate a trusted sensor reading, where both the time and the location of the sensor reading are known. At time t1, a secure time and location reading is obtained from the mobile device GPS unit: the secure counter value is included in this reading c1. At time t2, the secure sensor reading is obtained, and the secure counter value in this signed reading is c2 (where c2>c1). At time t3, another secure time reading is obtained from the GPS and it includes counter value c3 (where c3>c2).

All three signed readings are now provided to a cloud service for verification. The cloud service verifies that c3>c2>c1, all three counters are signed by the same trust module, all three sensors are part of the same mobile device (from the device registration described above), and that the time difference between t1 and t3 is less than some modest threshold (e.g., less than one minute). Note that this scheme relies upon GPS signals which are not easily available indoors. However, GPS can be used to bound the start and end period of when a sensor reading was taken, and the secure counter can be used to combine this information with periodic reading from the mobile device internal clock.

As previously indicated, in this second embodiment, the sensors perform one additional computational step beyond the first embodiment of signing the sensor readings and this adds extra overhead to sensor performance. The overhead can be small if the sensor is equipped with a relatively powerful processor; however, this presents a trade-off: a faster processor is more energy hungry and more costly. This performance versus cost trade-off can be considered as a feature in another implementation.

Privacy is a consideration of trusted sensors because sensor readings are signed with a trust module private key. One approach allows a user to obtain unsigned readings from trusted sensors. While this eliminates the potential of a privacy breach, it also invalidates the benefits of trusted sensors. In particular, this approach leaves users unable to demonstrate that the sensor readings have not been manipulated. Following are approaches that can be employed to reduce the privacy concerns of trusted sensors while retaining some benefits.

Two privacy concerns when using trusted sensors include anonymity and non-transferability. With respect to anonymity, users want to prove sensor readings have not been manipulated (tampered with) without revealing the user identity. With respect to non-transferability, a first user wants the capability to ensure that no other user can prove the validity of the first user trusted sensor readings. Thus, when an application verifies a sensor reading, the application cannot transfer enough information to a second user that allows the second user to verify the associated reading.

With respect again to anonymity, all trust modules support anonymous attestations, in which an attestation identity key (AIK) is obtained from a privacy CA. If a sensor reading is signed with an AIK, an application can verify that the reading has been signed by a valid trust module without revealing which module signed it. This mechanism can easily be adopted for trusted sensors. Trust modules can use direct anonymous attestations as a protocol that eliminates the need for a privacy CA.

With respect again to non-transferability, to ensure that sensor readings are non-transferable, a user cannot transmit the signed reading to an application. If the user did, the application could hold the signed reading and reuse it later: the reading is verifiable by anyone because of the digital signature. Thus, the user must convince the application of the sensor reading validity without having to transmit the sensor reading signature.

In cryptography, such problems are typically solved with zero-knowledge protocols that provide the following privacy guarantee: one party can prove to another that a statement is true without revealing anything beyond the veracity of the statement. For trusted sensors, a zero-knowledge protocol for verifying the sensor signatures reveals the sensor reading but not the actual signature. Unfortunately, there are no known efficient zero-knowledge protocols that use standard RSA (Rivest, Shamir and Adleman)-based cryptography. A practical alternative to zero-knowledge protocols are witness hiding proof of knowledge (WHPOK) protocols. WHPOK protocols are relaxations of zero-knowledge protocols that meet the desired non-transferability requirement. In contrast with zero-knowledge, which guarantees that an application will not learn any information beyond the validity of the signature, WHPOK only guarantees that the application does not receive a copy of the signature, and is unable to learn how to prove the signature validity.

It is possible to efficiently convert a traditional RSA signature into a WHPOK protocol. This makes WHPOK relatively easy to implement because it relies on traditional RSA, for which there are well-known cryptographic libraries available.

The following describes potential applications that can be enabled by the deployment of trusted sensors. The common premise across all these applications is that users have an incentive to lie about the sensor readings.

Location proofs is a trusted infrastructure that enables mobile devices to determine their location. Applications of location proofs can include store discounts for loyal customers; green commuting rewards people who leave cars at home and instead walk, bike, or commute by bus to work; location-restricted content delivery provides fine-grained location information about users accessing sites that provide content which is location-specific or subject to local copyright laws; reducing fraud on online auctions; voter registration by demonstrating the physical presence requirement common to many forms of elections in the US; and police investigations by allowing a suspect in an investigation to produce an alibi. A trusted GPS sensor providing a signed reading of a user's location combined with a timestamp eliminates the need for location proofs. As a result, the above applications can benefit from a trusted GPS sensor.

In participatory sensing applications, users upload individual sensor readings to a central database, typically indexed by location. By spreading the work of data collection across a large pool of users, participatory sensing applications can rapidly build vast repositories of useful information. Examples of participatory sensing applications include the locations of Wi-Fi access points, traffic and road conditions, monitoring air quality, understanding how swine flu is spreading across the country, and geo-tagged photos of buildings and landmarks. As new sensors are developed for mobile devices (e.g., a radiation sensor), new participatory sensing applications will also emerge based on these sensors.

One common problem faced by participatory sensing applications is that of data pollution: malicious users can upload forged data to "pollute" the database with false information. The Internet's lack of strong authentication mechanisms exacerbates this problem; a single user can create vast amounts of pollution. Data pollution prevention and detection for participatory sensing applications is an ongoing research problem.

Efforts to reduce data pollution can benefit from trusted sensors in two ways. First, an application can require each participant to use a related trust module to sign associated data samples, which limits the amount of data pollution from a single user. Second, applications that collect sensor readings (e.g., GPS-based locations or photos) can require participants to use a trusted sensor when uploading a reading. This drastically reduces the likelihood that the sensor reading has been tampered with.

However, not all participatory sensing applications collect only sensor readings. For example, a collaborative application that maps the spread of the influenza virus requires each user to upload: the user's location based on a sensor reading, and the user's health information (i.e., whether or not the user is infected) based on user input. A trusted GPS can help ensure the accuracy of the location data, but trusted sensors cannot prevent the user from providing incorrect information.

With respect to online authentication, although mobile phones typically do not include a fingerprint reader, these sensors can provide several uses. A trusted fingerprint reader can provide a simple way for users to authenticate to online websites. While password-based systems are by far the most common form of online authentication today, mobile phone users might prefer a fingerprint reader as an alternative to passwords, especially given the difficulty of typing on today's smartphone keyboards. Fingerprint readers are relatively convenient and avoid the risk of users forgetting their passwords. These properties can be appealing to many Internet users, and this may motivate websites to offer this form of online authentication.

The ability to distinguish between an activity performed by a person versus one performed by a program has many uses related to Internet security. Trusted sensors offer an alternative solution for this class of problems.

Websites currently use CAPTCHAs (completely automated public Turing test to tell computers and humans apart) for certain operations to distinguish between real users and automated programs. These operations include user registration and resetting a user password. Despite widespread use, CAPTCHAs are becoming increasingly difficult for users. As CAPTCHA-breaking programs become more sophisticated, websites are forced to increase the difficulty of extracting text from CAPTCHAs, which in turn makes it much more difficult for users to decipher. Another limitation is that people with certain disabilities cannot solve CAPTCHA challenges.

Trusted sensors provide an alternative to CAPTCHAs by increasing the likelihood that requests are made on behalf of real users. For example, a website can require customers to use a trusted fingerprint reader to create a new account, although a trusted fingerprint reader would uniquely identify the user making the request. There are also other solutions with better privacy properties that use trusted sensors. For example, a website can show a random number (i.e., a "nonce") to the user and ask the user to read back the number using a trusted microphone. The trusted microphone adds a timestamp to the voice sample before signing it and passing to the website. The site can use speech recognition to verify that the spoken number matches the challenge and that the timestamp is accurate (e.g., to eliminate "replay" attacks). Another solution for CAPTCHAs is to use a trusted proximity sensor.

With respect to fighting spam, DDoS (distributed denial of service), and click fraud, trusted sensors can also enable tagging e-mail messages or web requests with evidence that the requests were generated by a human. For example, an e-mail program can ask the user to use a trusted fingerprint reader whenever sending an e-mail. Similarly, a trusted proximity sensor can tag each web request with proof that a human is "near" the mobile device making the request.

With respect to authentic user-generated content, news companies are increasingly asking the general public to contribute photos and videos when present at a "news-worthy"

event. Such user-generated content is often included in breaking news stories on television and on the web. One problem news sites face is verifying that this user-generated content is authentic and has not been altered or manipulated. For example, videos can be modified to include video frames gathered elsewhere, and photos can be "doctored" to add or remove people at an event.

A trusted camera integrated into smartphones can reduce the chance that user-contributed content has been manipulated. A photo or video taken with a trusted camera embeds a signed location and timestamp in the content; news companies can have increased confidence in the legitimacy of submitted content by checking these location and timestamp readings.

With respect to vehicle sensors, as vehicles become more sophisticated, manufacturers can add new sensors to help prevent drunk driving, to help parents monitor child driving, or to prevent teenagers from driving too fast. In all these scenarios, drivers have an incentive to cheat by altering or fabricating a sensor reading. Trusted sensors raise the bar for such attacks by providing evidence that the sensed data has not been tampered with.

One issue that oftentimes arises when returning a borrowed item (e.g., a book from the library or a car rental) is determining who is responsible for any damage to the item being returned. A trusted camera can help determine if the problem was present before the item was borrowed. For example, a customer can take pictures of the rental car before signing the rental agreement, and then prove that they are not responsible for any pre-existing scratches or dents.

With respect to hazardous noise, people subjected to unhealthy levels of noise can suffer permanent hearing damage. To prevent this, people may need to resort to the courts to obtain noise-level ordinances or to shutdown activity that generates unhealthy levels of noise. A trusted microphone allows people to provide concrete evidence of harmful noise levels.

Another application is to the documentary evidence of crime scenes. Ensuring that evidence is admissible in a court of law depends in part on documenting how that evidence was handled between the crime scene and the court room. There are known cases where crime scene investigators or prosecutors have tampered with the evidence collected at a crime scene. When tampering is detected the evidence can no longer be used, and when it is not detected, innocent people can suffer unfortunate consequences. Trusted sensors could reduce both of these risks by making it difficult to tamper with evidence from crime scenes. For example, a trusted camera makes it more difficult to alter photos, and a trusted microphone would make it harder to alter an interview with a witness.

Utility companies perform periodic sensor readings to determine how much water, electricity, or gas a household consumes. Today, users must simply trust that these readings are accurate. Trusted sensors can empower the consumer to require the utility companies to provide the trusted sensor readings along with customer bills. Consumers can use these readings to prevent over-charging (either deliberate or accidental).

People can use a trusted short-range wireless interface (e.g., Bluetooth) to construct an encounter proof: a proof that the user encountered a certain other person also carrying a Bluetooth-enabled device. The role of the trusted wireless interface is to measure the radio characteristics of the other discovered device and to sign the characteristics to prevent further tampering. It has been shown that variations in radio transmitter hardware effectively provide a unique per-device signature. This signed radio signature is effectively an encounter proof which can be used to prove the encounter was with a specific individual (i.e., the one carrying the radio whose signals are present in the encounter proof) and to prove repeated encounters with the same individual.

Put another way, a sensor system is provided that comprises sensors of a device (e.g., mobile) that generate sensor readings for consumption by an application, and a trust component of the device that includes a hardware trust module which provides trust information to sign the sensor readings. The trust component can further comprise a virtualization component that isolates the sensors from the application. The virtualization component obtains the sensor readings from the sensors, facilitates signing of the sensor readings by the hardware trust module, and provides the signed sensor readings for access by the application.

The sensor readings of the device are each tagged with time information, the sensor readings and corresponding time information are signed by the trust information and sent as a combined multiple sensor readings to the application.

Alternatively, or in combination therewith, the trust component can include sensor trust software located at each of the sensors that provides and applies sensor trust information to raw sensor readings of the sensors, a sensor increments a secure counter associated with the hardware trust module, obtains a counter value, and the sensor trust software signs the raw sensor reading and the counter value using the sensor trust information. The trust component can sign a sensor reading using an attestation key that facilitates attestation anonymity.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
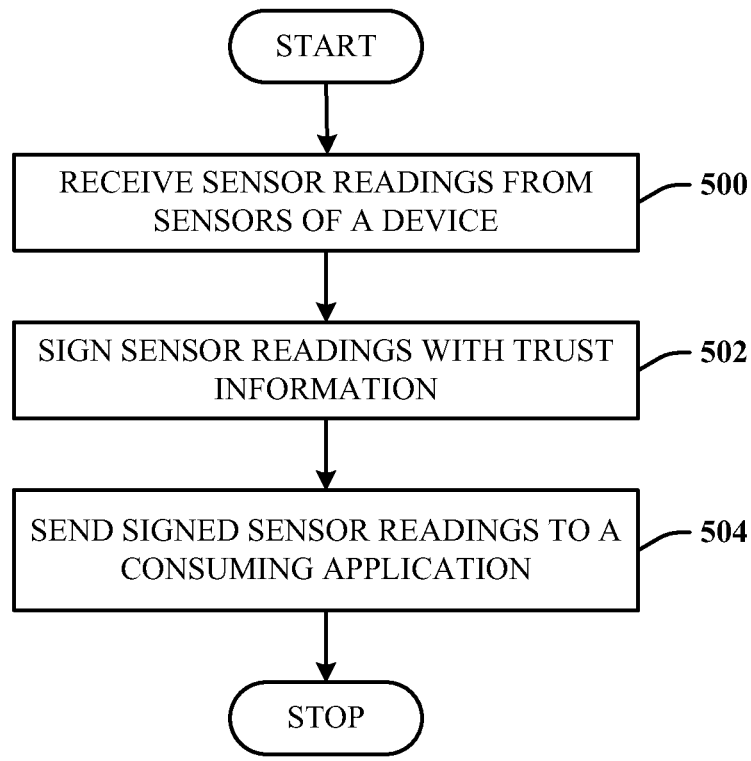
FIG. 5 illustrates a computer-implemented sensor method in accordance with the disclosed architecture.

FIG. 5 illustrates a computer-implemented sensor method in accordance with the disclosed architecture. At 400, sensor readings are received from sensors of a device. At 402, the sensor readings are signed with the trust information. At 404, the signed sensor readings are sent to a consuming application.

Figure 6:
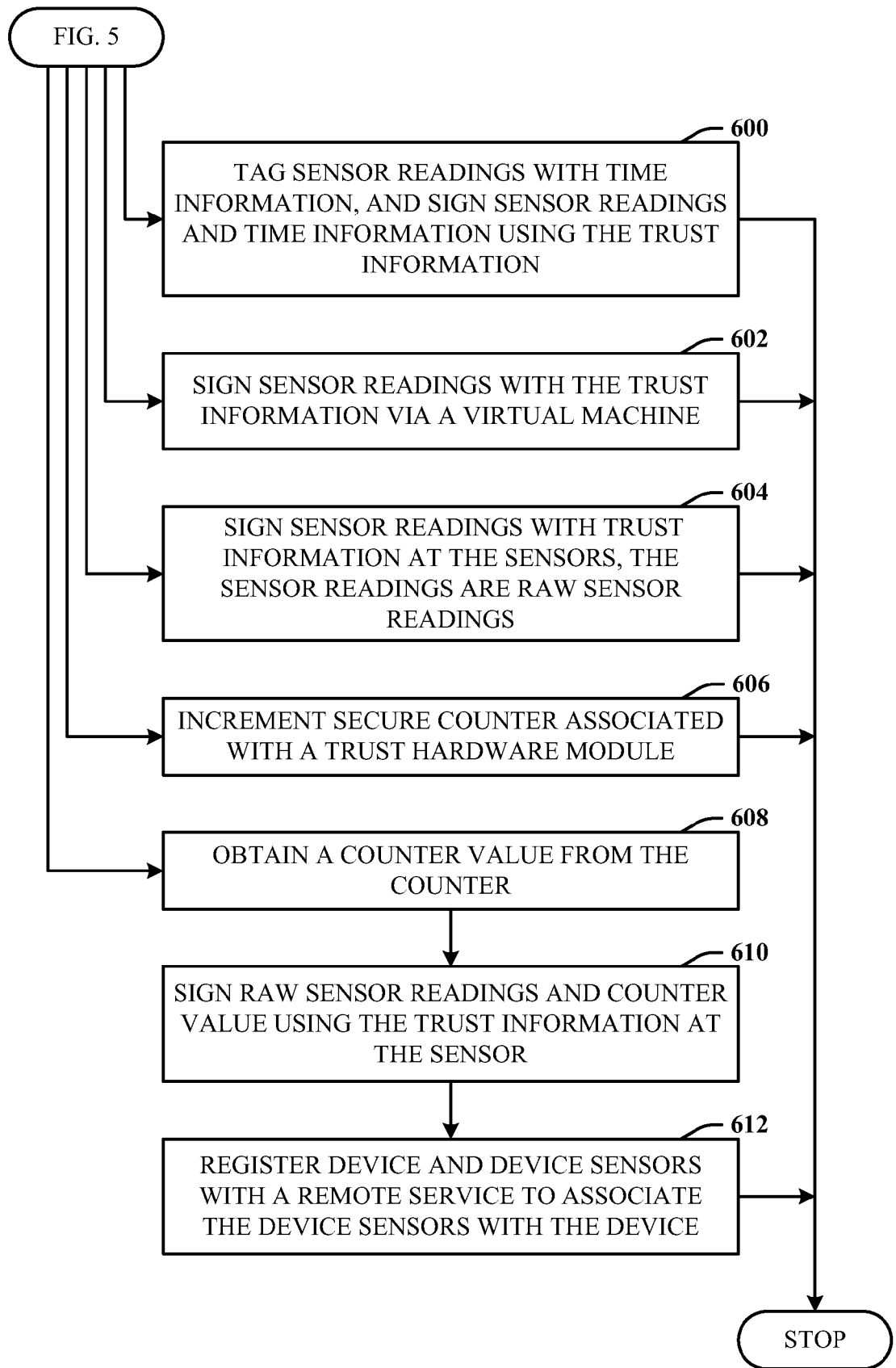
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, the sensor readings are tagged with time information and, the sensor readings and the time information are signed using the trust information. At 602, the sensor readings are signed with the trust information via a virtual machine. At 604, the sensor readings are signed with the trust information at the sensors, where the sensor readings are raw sensor readings. At 606, a secure counter associated with a hardware trust module is incremented. At 608, a counter value is obtained from the counter. At 610, the raw sensor readings and the counter value are signed at the sensors using the trust information. At 612, the device and device sensors are registered with a remote service to associate the device sensors with the device.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
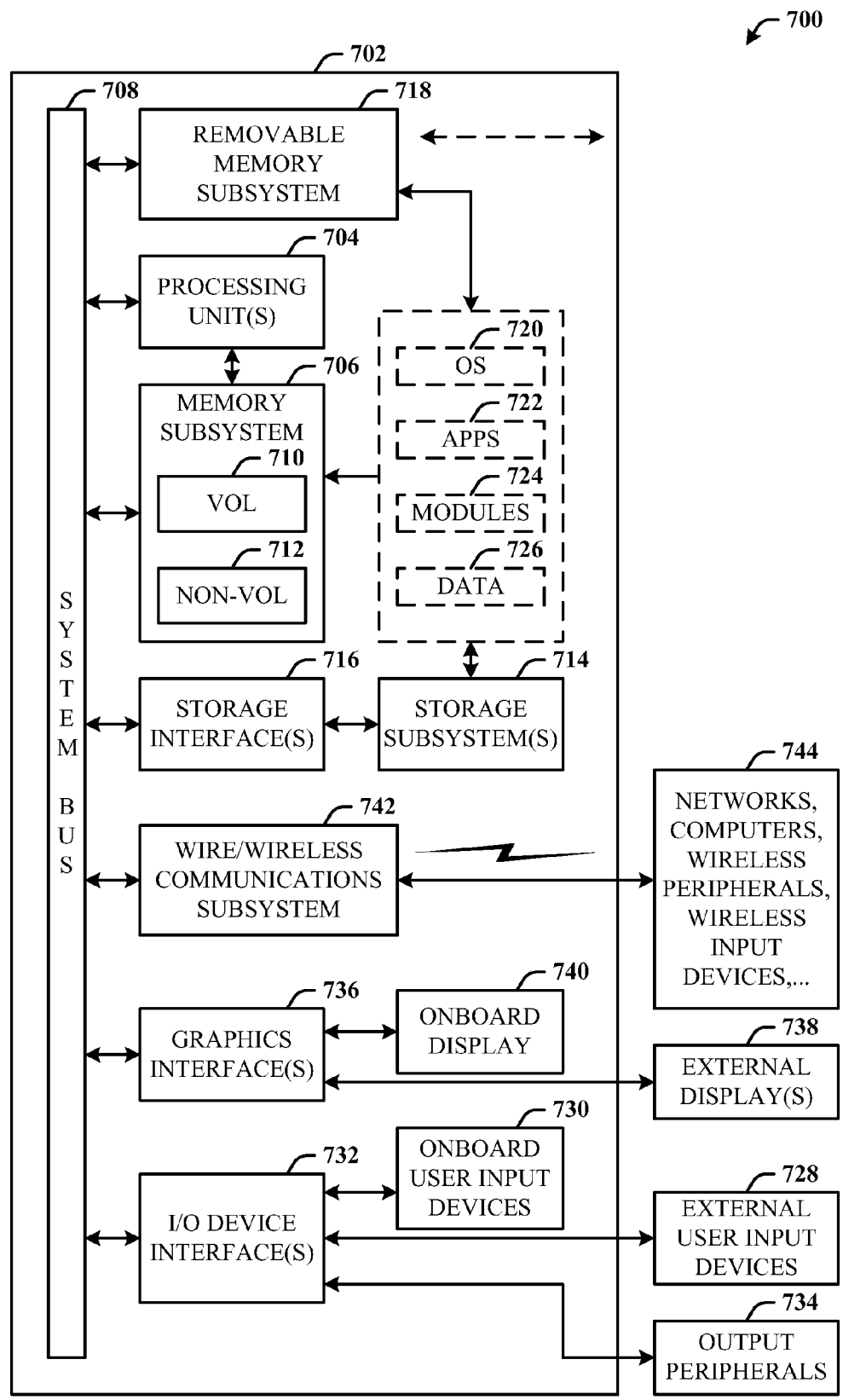
FIG. 7 illustrates a block diagram of a computing system that executes trusted sensors in accordance with the disclosed architecture.

Referring now to FIG. 7, there is illustrated a block diagram of a computing system 700 that executes trusted sensors in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the entities and components of the system 300 of FIG. 3, the entities and components of the system 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented sensor method executed by a processor comprising:
    receiving sensor readings from sensors of a device, the device including a trust component that provides trust information which is applied to the sensor readings to create trustworthy readings for communication to a consuming application;
    when the trust component includes a virtualization component that virtualizes the sensors and facilitates interaction with the sensors by the consuming application:
        signing the sensor readings with the trust information via a virtual machine within the device; and
    independent of software configuration of the device, when the trust component includes a central hardware trust module that comprises a secure counter:
        obtaining a counter value from the secure counter;
        signing the sensor readings and the obtained counter value at the sensors using the trust information; and
        registering the device and the sensors with a remote service to associate the sensors with the device after signing the sensor readings and the obtained counter value.

2. The method of claim 1, further comprising tagging the sensor readings with time information and signing the sensor readings and the time information using the trust information.

3. The method of claim 1, wherein the sensor readings are raw sensor readings.

4. The method of claim 1, further comprising incrementing the secure counter before obtaining a counter value from the secure counter.

5. The method of claim 1, wherein the trust information is provided according to a trustworthy computing technology.

6. The method of claim 1, further comprising preventing transferability of the sensor readings by employing a knowledge protocol that reveals the sensor readings of the signed sensor readings without revealing signatures used to sign the sensor readings.

7. The method of claim 1, wherein signing the sensor readings comprises signing the sensor readings using an attestation key that facilitates attestation anonymity.

8. A device comprising:
    a processor; and
    executable instructions operable by the processor, the executable instructions comprising a sensor method, the sensor method comprising:
        receiving sensor readings from sensors of the device, the device including a trust component that provides trust information which is applied to the sensor readings to create trustworthy readings for communication to a consuming application;
        when the trust component includes a virtualization component that virtualizes the sensors and facilitates interaction with the sensors by the consuming application:
            signing the sensor readings with the trust information via a virtual machine within the device; and
        independent of software configuration of the device, when the trust component includes a hardware trust module that comprises a secure counter:
            obtaining a counter value from the secure counter;
            signing the sensor readings and the obtained counter value at the sensors using the trust information; and registering the device and the sensors with a remote service to associate the sensors with the device after signing the sensor readings and the obtained counter value.

9. The device of claim 8, wherein the sensor readings are raw sensor readings.

10. The device of claim 8, wherein the sensor method further comprises tagging the sensor readings with time information.

11. The device of claim 10, wherein the sensor method further comprises signing the tagged sensor readings and the time information using the trust information.

12. The device of claim 8, wherein the sensor method further comprises incrementing the secure counter before obtaining a counter value from the secure counter.

13. The device of claim 8, wherein the sensor method further comprises preventing transferability of the sensor readings by employing a knowledge protocol that reveals the sensor readings of the signed sensor readings without revealing signatures used to sign the sensor readings.

14. The device of claim 8, wherein signing the sensor readings comprises signing the sensor readings using an attestation key that facilitates attestation anonymity.

15. A storage device for storing computer readable instructions, the computer readable instructions when executed by a processing device performs a sensor method, the sensor method comprising:
receiving sensor readings from sensors of a mobile device, the mobile device including a trust component that provides trust information which is applied to the sensor readings to create trustworthy readings for communication to a consuming application;
when the trust component includes a virtualization component that virtualizes the sensors and facilitates interaction with the sensors by the consuming application:
signing the sensor readings with the trust information via a virtual machine within the mobile device; and
independent of software configuration of the mobile device, when the trust component includes a central hardware trust module that comprises a secure counter:
obtaining a counter value from the secure counter;
signing the sensor readings and the obtained counter value at the sensors using the trust information; and
registering the mobile device and the sensors with a remote service to associate the sensors with the mobile device after signing the sensor readings and the obtained counter value.

16. The storage device of claim 15, wherein the sensor readings are raw sensor readings.

17. The storage device of claim 15, wherein the sensor method further comprises tagging the sensor readings with time information and signing the sensor readings and the time information using the trust information.

18. The storage device of claim 15, wherein the sensor method further comprises incrementing the secure counter before obtaining a counter value from the secure counter.

19. The storage device of claim 15, wherein the sensor method further comprises preventing transferability of the sensor readings by employing a knowledge protocol that reveals the sensor readings of the signed sensor readings without revealing signatures used to sign the sensor readings.

20. The storage device of claim 15, wherein signing the sensor readings comprises signing the sensor readings using an attestation key that facilitates attestation anonymity.

* * * * *